United States Patent [19]

Smoot

[11] Patent Number: 5,618,136
[45] Date of Patent: Apr. 8, 1997

[54] DUAL BLOWER RAILCAR DISCHARGE AND CONVEYOR SYSTEM AND METHOD

[75] Inventor: David K. Smoot, Overland Park, Kans.

[73] Assignee: Smoot Co., Kansas City, Kans.

[21] Appl. No.: 511,562

[22] Filed: Aug. 4, 1995

[51] Int. Cl.[6] ............................................. B65G 53/06
[52] U.S. Cl. ........................... 406/93; 406/41; 406/119; 406/145; 406/146
[58] Field of Search ............................ 406/39, 41, 93, 406/94, 95, 109, 119, 120, 144, 145, 146

[56] References Cited

U.S. PATENT DOCUMENTS

| | | | |
|---|---|---|---|
| 1,466,413 | 8/1923 | Schaanning | 406/95 |
| 1,644,699 | 10/1927 | Ward | 406/93 |
| 2,919,159 | 12/1959 | Lacroix | 406/137 |
| 3,288,537 | 11/1966 | Hitch | 406/136 |
| 4,101,175 | 7/1978 | Kull | 406/123 |
| 4,177,952 | 12/1979 | Rikker | 241/40 |
| 4,451,184 | 5/1984 | Mitchell | 406/105 |
| 4,500,228 | 2/1985 | McDonald et al. | 406/61 |
| 4,630,975 | 12/1986 | Becker | 406/85 |
| 4,900,200 | 2/1990 | Harumoto et al. | 406/93 |

*Primary Examiner*—Andrew C. Pike
*Attorney, Agent, or Firm*—Litman, McMahon and Brown, L.L.C.

[57] ABSTRACT

A dual blower railcar discharge and conveyor system and method includes a first, relatively high pressure, low volume blower for pressurizing a railcar and a short section of discharge convey line attached to the railcar. A second, relatively high volume, low pressure blower is attached to pressurize a transport convey line. The discharge convey line is connected into the transport convey line, which is of somewhat larger diameter than the discharge convey line. With a pair of smaller blowers used in place of a single large, high horsepower blower, efficiency is enhanced and system complexity is markedly reduced.

16 Claims, 2 Drawing Sheets

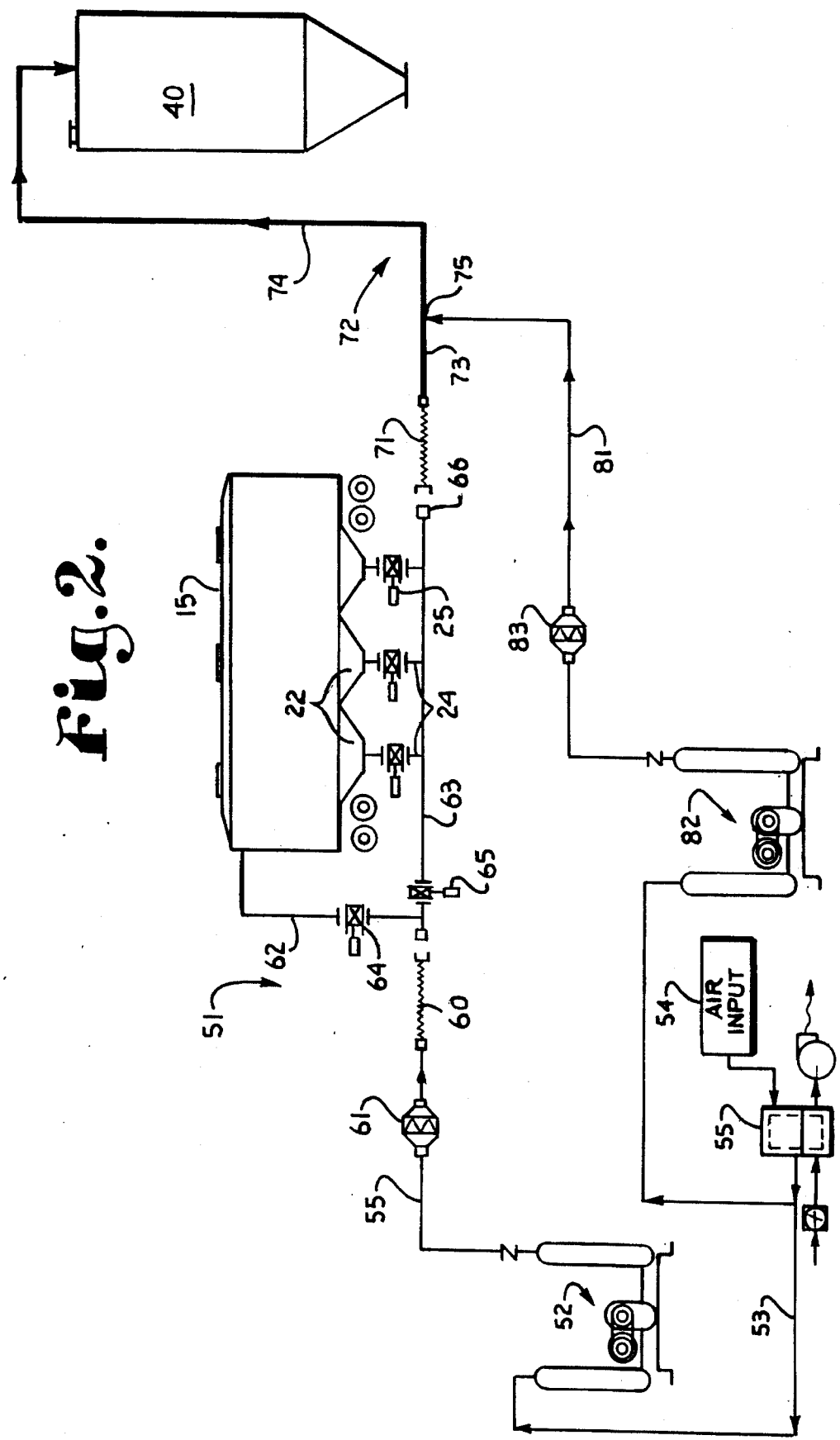

005,618,136

DUAL BLOWER RAILCAR DISCHARGE AND CONVEYOR SYSTEM AND METHOD

FIELD OF THE INVENTION

The present invention relates to a dual blower railcar discharge and conveyor system and method, and, more particularly, to a railcar discharge system in which a first, high speed and relatively low volume blower is connected to a railcar pressurization and product discharge line which pressurizes and off-loads the railcar. The railcar discharge line intersects with a larger diameter transport convey line for further conveying the off-loaded product and a second, high volume and relatively low pressure blower is connected to the transport convey line.

BACKGROUND OF THE INVENTION

The discharge of granular and other dry materials from railroad hopper cars has long presented a variety of problems. Since the 1940's, pressure-type pneumatic conveyors have been developed in which a compressor (blower) is attached to a convey line which branches at the railcar. One branch of the convey line is connected to pressurize the railcar and a second branch is connected to a discharge outlet of the pressurized railcar to convey material away from the railcar. Government regulations in the United States limit the pressurization of railcars to less than 15 PSI, thus effectively limiting the rate of off-loading material from these railcars.

Pressurized discharge systems from the late 1940's until the mid 1980's typically used convey lines of 4" or 5" in diameter. While demand for increased off-loading rates was present, the 15 PSI railcar pressurization limits prevented any significant increases in line sizes or off-loading rates. Finally, in the late 1980's, some discharge and conveyor systems used large enough blowers to increase discharge line sizes to 8" diameter and transport convey line sizes to 12" diameter. A bypass and throttling valve was added to regulate the amount of pressurized air entering the railcar discharge convey line vs. the air in the transport convey line.

While these changes improved the off-loading rates, a number of problems remained. In order to pressurize the railcar to approximately 15 PSI and, at the same time, to provide the volume of air needed to efficiently move the product through an 8" discharge convey line and thence through a considerable length of 12" transport convey line, large blowers were needed which required high horsepower motors, which are very expensive to purchase and to operate. In addition to the normal requirements of railcar pressurization and product conveyance, prior art blowers needed to be sized to compensate for the inefficiency and the relatively large pressure drop across the bypass throttling valve where flow of the transport convey air flow is bottlenecked. For example, typical discharge and transport convey line pressures are 6 PSI as compared to the 14+ PSI needed to pressurize the railcar. Some single blower systems have used motors of 500 horsepower, for example. Motors of this size do not typically run on ordinary voltages, e.g., a 500 horsepower motor is typically designed to utilize 6600-volt power, which is not readily available in a normal plant. Finally, it is very difficult to balance the volume of air entering the railcar vs. the volume of air in the discharge convey line as well as the transport convey line. With too much pressure drop between the railcar and the discharge convey line, material is moved too fast through the discharge line. This increases the wear on system components, and, if the product being conveyed is degradable, too much speed will adversely affect the product. By contrast, with too little pressure drop, material movement is too slow, allowing partial or total blockage of the discharge chutes and discharge and transport convey lines to result. In addition to the bypass throttling valve, other expensive and relatively complicated pressure regulators were required between the blower and the railcar as well as between the blower and the discharge convey line to regulate air volume and pressure. Unless unloading personnel are well trained and vigilant, proper air flow regulation via these regulators is often intermittent at best.

Accordingly, a need exists for an improved pressurized railcar dry material discharge and conveyor system and method. Such an improved system and method should preferably achieve discharge rates comparable to known systems equipped with throttling valves but with smaller compressors driven by lower horsepower motors. Finally, the improved system and method should preferably eliminate the bypass throttling valve with its inherent losses and balancing problems. Air flow regulation should be simplified as well.

SUMMARY OF THE INVENTION

The present invention is directed to a dual blower pressurized railcar discharge and conveyor system and method. The system includes a first, relatively high pressure and low volume blower for pressurizing a railcar and for providing convey air to a short length of discharge convey line connected to the railcar. The short discharge convey line is connected to a larger diameter transport convey line which transports the discharged material away from the railcar unloading area. A second, relatively high volume and low pressure blower is connected to the transport convey line to pressurize the transport convey line. No throttling valve is needed between the discharge convey line and the transport convey line and no critical balancing of air volume is required between the railcar pressurization branch and the discharge line. In addition, the use of dual blowers requires a pair of electric motors which, even when added together, do not total as high horsepower as an electric motor required to drive a known single blower discharge and conveyor system with a bypass throttling valve.

OBJECTS AND ADVANTAGES OF THE INVENTION

The principal objects of the present invention include: to provide an improved dual blower railcar discharge and conveyor system and method; to provide such an improved system and method in which a pair of blowers are used for pressurizing a railcar and for supplying compressed air to a conveyor system for transporting granular or other dry material discharged from the railcar; to provide such a system and method wherein the pair of blowers includes a first, relatively high pressure and low volume blower for pressurizing the railcar and a short length of discharge convey line connected directly to the railcar and a second, relatively high volume and low pressure blower connected to a longer, larger diameter transport convey line to supply pressurized convey air to the transport convey line to convey the material over a considerable distance; to provide such a system and method in which no throttling valve is needed between the pressurizing blower and the transport convey line; to provide such a system and method in which no critical balancing of air volume is required between the railcar discharge line and the transport line; to provide such a system and method which requires motors with less horsepower than known conveying systems; and to provide such a system and method which is particularly well adapted for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 2 is a schematic block diagram of a dual blower railcar discharge and conveyor system and method in accordance with the present invention.

DETAILED DESCRIPTION OF THE INVENTION

Figure 1:
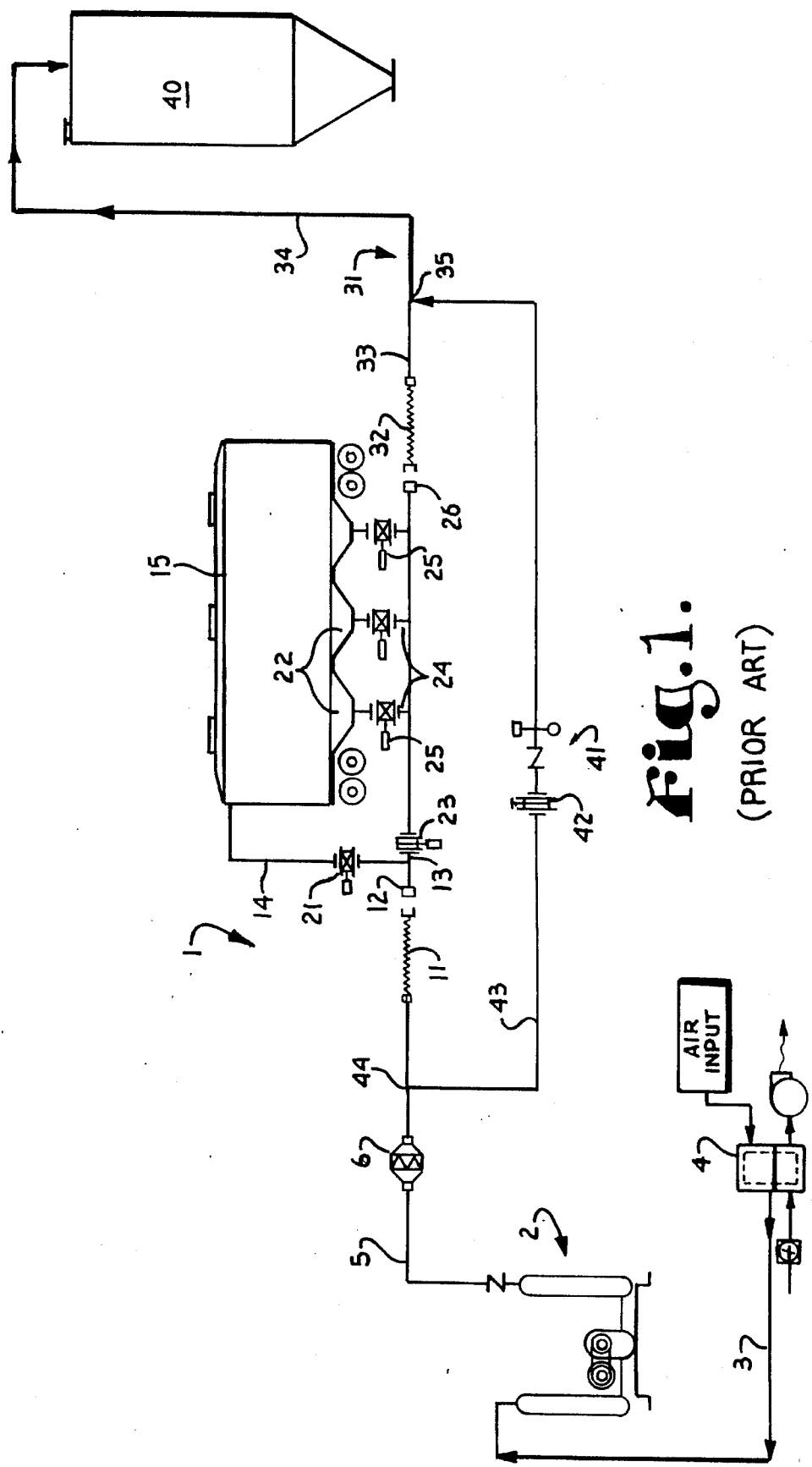
FIG. 1 is a schematic diagram of a known, prior art single blower railcar discharge and conveyor system.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

I. Prior Art Single Blower Railcar Discharge System

Referring to drawing FIG. 1, the reference numeral 1 generally designates a prior art single blower railcar discharge system. In the system 1, a single, relatively high pressure and high volume blower assembly 2 is connected to an air input line 3. Outside air is input into the line 3 via a dryer 4. The blower assembly 2 provides compressed air to a line 5 and an optional heat exchanger 6 cools the compressed air within the line 5. The line 5, which can be, for example, an 8" diameter line, terminates in a flexible hose 11. A mating connector 12 is attached to a short railcar discharge convey line 13 and is removably connectable to the flexible hose 11. A railcar pressurization line 14, which may be a 5" diameter line, for example, is connected to the discharge convey line 13 to direct compressed air into a railcar 15. A first modulating valve 21 is connected in the pressurization line 14 to selectively divert air from the discharge line 13 to the railcar 15 to insure constant pressure within the railcar 15. Typically such railcars will be pressurized to slightly less than 15 PSI, e.g., to 13 or 14 PSI. It should be noted that, for simplification of the drawings the pressurization line 14 is illustrated as entering the top of the railcar 15, railcar pressurization is often accomplished via aeration or evasser pads in the bases of hoppers 22, in which case the pressurization line 14 would be directed to a manifold connected to the bases of the hoppers 22. A second modulating valve 23 is inserted within the discharge line 13 to regulate air pressure and flow within the discharge line 13. In a typical, modern high volume convey system, the discharge line 13 would be an 8" diameter line and pressurization within the discharge line 13 would typically be on the order of 6 PSI.

The railcar 15 has a number of hoppers 22 which are connected to the discharge line 13 via connection lines 24. For purposes of illustration, the lines 24 are shown as vertical but in most installations, due to space limitations, the lines 24 would extend horizontally through an off-loading adaptor of the type taught in U.S. Pat. No. 5,387,058 entitled AIRLIFT RAILCAR DISCHARGE ADAPTOR, and assigned to the present assignee. A number of valves 25 are inserted in respective ones of the connection lines 24 such that the hoppers 22 can be off-loaded individually. The discharge line 13 then terminates in a second connector 26. A transport convey line 31 includes a second flexible hose 32 which is removably connectable to the second connector 26. The transport convey line 31 typically includes an 8" diameter line section 33 immediately adjacent the flexible hose 32, widening to a 12" diameter line section 34 extending from a junction point 35. In order to minimize pressure drop thereacross, it is important to keep the section of 8" line 33 as short as possible, and it should be emphasized that the lengths shown in FIGS. 1 and 2 are for illustration only and are not necessarily drawn to scale. The transport line 31 is designed to transport granular or other dry material over a relatively long distance to a fixed storage facility, such as a hopper 40.

In order for the single blower assembly 2 to provide both relatively low volume, high pressure air to the railcar 15, and relatively high volume, low pressure air to the transport line 31, a throttling valve 41 including a third modulating valve 42 is positioned in a bypass line 43 connected between a junction point 44 in the air supply line 5 and the junction point 35 in the transport line 31. The third modulating valve 42 must divert a quantity of compressed air sufficient to charge the large diameter transport line 31, for example, to a pressure of 6 PSI, while providing sufficient air volume and pressure to pressurize the railcar 15 and provide convey air to the discharge line 13, as described above. This requires exacting control of air flow in the various line branches with constant monitoring by plant personnel. In such a system, if too much air is supplied to the railcar 15, the pressure drop will be excessive. On the other hand, if too little air flow is supplied to the railcar 15, product will tend to stick within the discharge line 13 and the lines 24, resulting in partial or total blockage of these lines. Furthermore, the large pressure drop across the bypass line 43 and the throttling valve 41 requires a large capacity, high horsepower blower assembly 2 to compensate, thus creating an inefficient system.

II. Dual Blower Railcar Discharge and Conveyor System and Method

Referring to FIG. 2, a dual blower railcar discharge system in accordance with the present invention is illustrated in block diagram form and is generally indicated by numeral 51. In the system 51, a first blower assembly 52 is a high pressure, relatively low volume blower. The first blower assembly 52 has an input connected to an input line 53 and a source of air 54, which can include a dryer 55. The first blower assembly 52 has an output connected to an air supply line 55 terminating in a flexible hose 60. An optional heat exchanger 61 can be provided to cool the air prior to reaching the railcar 15. The first blower assembly 52 is specifically designed to pressurize the railcar 15 via a pressurization line 62, as well as to provide convey air to a short discharge line 63, into which granular or other dry material is selectively fed from the railcar 15 via the lines 24 and the valves 25. The railcar 15, and the lines 24 and the valves 25 are the same as in FIG. 1, and are numbered accordingly. Again, the lines 24, although shown as vertical for purposes of illustration, would normally be substantially horizontal due to space constraints. A first modulating valve 64 is positioned in the pressurization line 62 to control air flow to the railcar 15 and an optional second modulating valve 65 is connected to control air flow through the discharge line 63.

As in FIG. 1, downstream of the discharge line 63 is a connector 66 removably connectable to a flexible hose 71, which, in turn, is connected to a transport convey line 72. The transport line 72 includes a smaller diameter first section 73, e.g., 8" in diameter, and a larger diameter second section 74, e.g., 12" in diameter, extending beyond a junction point 75. Connected to the transport line 72 at the junction point 75 is a second air supply line 81, which is, in turn, connected to a second blower assembly 82. The second blower assembly 82 is a relatively low pressure, high volume blower designed to provide convey air to the transport line 72 at a pressure of approximately 6 PSI, for example. The second blower assembly 82 can be connected to the same air source 54 and dryer 55 as the first blower assembly 52. If desired, a second heat exchanger 83 can be provided to cool air from the second blower assembly 82.

As is readily apparent from a comparison of FIGS. 1 and 2, the elimination of the bypass line 43 and the throttling valve 41 from the single blower system of FIG. 1 by using the dual specialized blower assemblies 52 and 82 of FIG. 2 eliminates the large pressure drop across the valve 41, eliminates the critical air flow balancing required of the system of FIG. 1, and allows a much more efficient use of electrical power. For example, in one representative system, a single blower assembly, such as the assembly 2 in FIG. 1, was required to be driven by a 500-horsepower motor. In replacing the single blower 2 of FIG. 1 with dual blowers 52 and 82, as in FIG. 2, the single 500-horsepower motor was replaced by a 250-horsepower motor for the high pressure blower 52 while a 200-horsepower motor was required for the low pressure blower 82, achieving an initial cost savings of approximately 50% for the motors, and achieving an overall power requirement reduction of approximately 10%. Also, eliminating the requirement to upgrade plant power to 6600 volts provides additional significant savings.

In addition, the second blower assembly 82 can be sized to provide increased air flow to the larger diameter transport line section 74 without the losses incurred with the use of bypass valves such as the throttling valve 41, thus providing increased air pressure over a distance and allowing longer conveying runs to be achieved than with single blower systems.

In one embodiment, the blower 52 was driven by a 250-horsepower motor powered with a standard 460-volt line and developing air volume in the range of approximately 1800–2200 standard cubic feet per minute (SCFM) and preferably at 2095 SCFM at a pressure in the range of 16–18 PSI. The actual pressure delivered by the blower 52 would be equal to the pressure in the railcar, (e.g., 13–14 PSI) plus the pressure drop across the various elements between the blower 52 and the railcar 15 including the line 55, the hose 60 and the valves 64 and 65, etc. The blower 82 was driven by a 200-horsepower motor, also operating off of standard 460-volt power and developing air volume in the range of 2500–2800, and preferably at about 2650 SCFM, and air pressure in the range of 5–7 PSI, and preferably at about 6.3 PSI. Differing installations and different materials will necessitate variations in the required air volume and pressure. These two blowers were used to replace a single blower driven by a 500-horsepower motor and developing approximately 4800 SCFM at 18 PSI.

Again, for simplicity of illustration in FIG. 2, as in FIG. 1, the railcar pressurization line 62 in FIG. 2 has been illustrated as entering the top portion of the railcar 15 although, in many railcars, pressurization is accomplished via aeration pads near the base of hoppers 22.

It is to be understood that while certain forms of the present invention have been illustrated and described herein, it is not to be limited to the specific forms or arrangement of parts described and shown.

I claim:

1. In a pneumatic railcar discharge and conveying system in which a railcar is pressurized and dry material from the pressurized railcar is off-loaded to a pneumatic discharge convey line and then transferred to a transport convey line, the improvement comprising:

(a) a first blower providing compressed air to pressurize the railcar and to provide convey air to the discharge convey line; and (b) a second blower providing compressed air to the transport convey line.

2. A railcar discharge system as in claim 1, wherein:

(a) said first blower is a relatively high pressure, low volume blower.

3. A railcar discharge system as in claim 2, wherein:

(a) said first blower provides the air therefrom at a volume in a range of 1800–2200 SCFM at a pressurization in a range of 16–18 PSI.

4. A railcar discharge system as in claim 1, wherein:

(a) said second blower is a relatively low pressure, high volume blower.

5. A railcar discharge system as in claim 4, wherein:

(a) said second blower provides the air therefrom at a volume in a range of 2500–2800 SCFM at a pressurization in a range of 5–7 PSI.

6. A railcar discharge system as in claim 1, wherein:

(a) said transport convey line includes a section with a diameter which is larger than that of said discharge line, said second blower being connected to supply compressed air to said larger diameter section.

7. A railcar discharge system as in claim 1, wherein:

(a) said discharge convey line has a first diameter;

(b) said transport convey line includes a first section immediately adjacent said discharge convey line with a diameter approximately equal to said first diameter and a second section with a diameter which is larger than said first diameter;

(c) said first blower supplies the air therefrom to said discharge section and said first section of said transport convey line; and (d) said second blower supplies the air therefrom to said second section of said transport convey line.

8. A railcar discharge system as in claim 7, wherein:

(a) said first blower is a relatively high pressure, low volume blower; and (b) said second blower is a relatively low pressure, high volume blower.

9. A railcar discharge system as in claim 7, wherein:

(a) said first blower provides the air therefrom at a volume in a range of 1800–2200 SCFM at a pressurization in a range of 16–18 PSI; and (b) said second blower provides the air therefrom at a volume in a range of 2500–2800 SCFM at a pressurization in a range of 5–7 PSI.

10. In a pneumatic railcar discharge and conveying system in which a railcar is pressurized and dry material from the pressurized railcar is off-loaded to a pneumatic discharge convey line and then transferred to a transport convey line which is connected to said discharge convey line, the improvement comprising:

(a) a first, relatively high pressure, low volume blower providing compressed air to pressurize the railcar and to provide convey air to the discharge convey line; and (b) a second, relatively low pressure, high volume blower providing compressed air to the transfer convey line.

11. A railcar discharge system as in claim 10, wherein:

(a) said first blower provides the air therefrom at a volume in a range of 1800–2200 SCFM at a pressurization in a range of 16–18 PSI; and (b) said second blower provides the air therefrom at a volume in a range of 2500–2800 SCFM at a pressurization in a range of 5–7 PSI.

12. A railcar discharge system as in claim 10, wherein:

(a) said discharge convey line has a first diameter;

(b) said transport convey line includes a first section immediately adjacent said discharge convey line with a diameter approximately equal to said first diameter and a second section with a diameter which is larger than said first diameter;

(c) said first blower supplies the air therefrom to said discharge convey line and said first section of said transport convey line; and (d) said second blower supplies the air therefrom to said second section of said transport convey line.

13. In a pneumatic railcar discharge and conveying system in which a railcar is pressurized and dry material from the pressurized railcar is off-loaded to a pneumatic discharge convey line and then transferred to a transport convey line which is connected to said discharge convey line, the improvement comprising:

(a) a first, relatively high pressure, low volume blower providing compressed air at a volume in a range of 1800–2200 SCFM at a pressurization in a range of 16–18 PSI to pressurize the railcar and to provide convey air to the discharge convey line; and (b) a second, relatively low pressure, high volume blower providing compressed air at a volume in a range of 2500–2800 SCFM at a pressurization in a range of 5–7 PSI to the transfer convey line;

(c) said discharge convey line having a first diameter;

(d) said transport convey line including a first section immediately adjacent said discharge convey line with a diameter approximately equal to said first diameter and a second section with a diameter which is larger than said first diameter;

(e) said first blower supplying the air therefrom to said discharge convey line and said first section of said transport convey line;

(f) said second blower supplying the air therefrom to said second section of said transport convey line.

14. A method of discharging dry material from a railcar into a short discharge convey line and conveying the dry material over a distance in a transport convey line connected to the discharge convey line, said method comprising the steps of:

(a) connecting a relatively high pressure, low volume first blower to pressurize the railcar and to provide convey air to the short discharge convey line; and (b) connecting a relatively low pressure, high volume second blower to provide convey air to the transport line.

15. A method as in claim 14, and further comprising the steps of:

(a) providing air at a volume in a range of 1800–2200 SCFM at a pressurization in a range of 16–18 PSI from said first blower; and (b) providing air at a volume in a range of 2500–2800 SCFM at a pressurization in range of 5–7 PSI from said second blower.

16. A method as in claim 14 wherein said discharge line has a first diameter and said transport line includes a section which has a second diameter larger than said first diameter, and wherein the step of connecting said low pressure, high volume second blower includes connecting said second blower to the larger diameter section of said transport line.

* * * * *